Patented Aug. 24, 1948

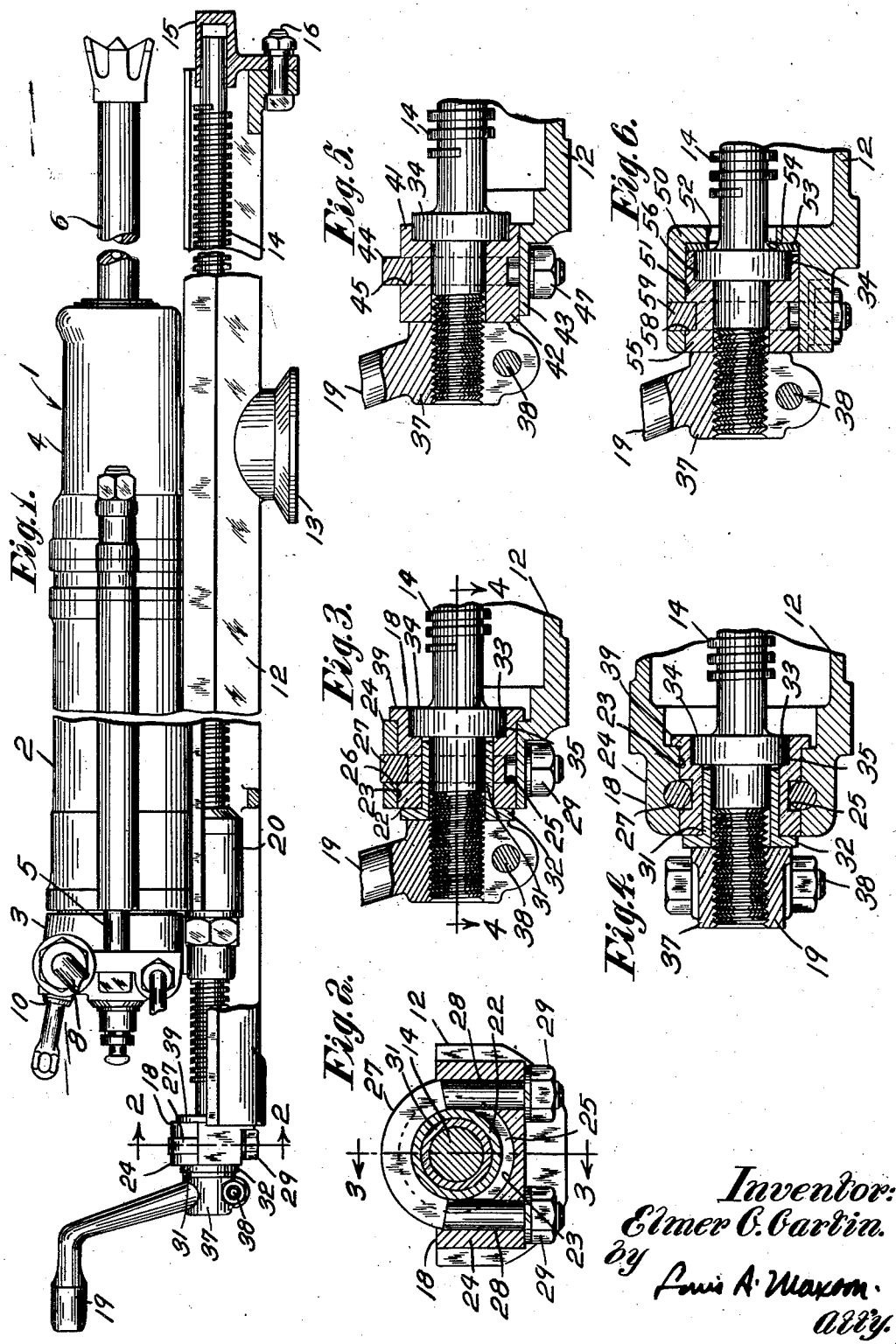

2,447,852

UNITED STATES PATENT OFFICE 2,447,852

BEARING STRUCTURE

Elmer G. Gartin, Claremont, N. H., assignor to Joy Manufacturing Company, a corporation of Pennsylvania Application January 27, 1943, Serial No. 473,664

12 Claims. (Cl. 308—22)

My invention relates to bearing structures, and more particularly to bearing structures adapted especially for use with feed screws of hammer type drills.

It is desirable to provide for a feed screw of a hammer type drill, a bearing structure which is adjustable to take up any longitudinal play of the feed screw made possible by a wearing of the parts. It is also desirable that the wear take place, as far as possible, on parts which can easily be replaced and which are comparatively inexpensive.

A suitable bearing structure may comprise concentric bearing sleeves, one clamped in a stationary position and the other fixed to rotate with the feed screw and adjustable longitudinally of the latter. The stationary bearing sleeve may have opposite end surfaces, one engageable by an enlargement on the feed screw and the other engageable by a flange on the rotatable bearing sleeve. By threading a member on the feed screw into engagement with the rotatable bearing sleeve, the position of the latter may be adjusted to take up any play that may be caused by wear at the end surfaces.

In another form, the bearing structure may comprise only a single bearing sleeve clamped in a stationary position and having one of its end surfaces engageable by an enlargement on the feed screw while the other end surface is engageable by a member threadedly mounted on the feed screw. In still another form, bearing members may be held at opposite sides of the enlargement on the feed screw for receiving the longitudinal thrusts of the latter.

An object of my invention is to provide an improved bearing structure. Another object is to provide an improved bearing structure having adjustable bearing members for taking up the play resulting from the wearing of the parts. Still another object is to provide an improved bearing structure made up of parts which can easily be replaced. Yet another object is to provide an improved bearing structure for the feed screw of a hammer type drill, said structure being adapted to take the longitudinal thrusts of the feed screw and being adjustable to limit its longitudinal movements. Still another object is to provide an improved feed screw mounting arrangement. Other objects of the invention will appear in the course of the following description.

There are shown in the drawing several illustrative forms which my invention may assume in practice.

In this drawing:

Fig. 1 is a side elevational view of a drill mechanism having my invention incorporated therein, parts of the mechanism being broken away to facilitate illustration.

Fig. 2 is an enlarged cross sectional view taken on the plane of the line 2—2 of Fig. 1.

Fig. 3 is a vertical sectional view taken on the plane of the line 3—3 of Fig. 2.

Fig. 4 is a horizontal sectional view taken on the line 4—4 of Fig. 3.

Fig. 5 is a vertical sectional view showing a modification of the invention.

Fig. 6 is a vertical sectional view showing another modification of the invention.

There is shown in the drawing a drill mechanism, generally designated 1, in which my improved bearing structure, in its various forms, is incorporated. It will be understood, however, that my invention, in its broader aspects, is not limited to use with drill mechanisms, but may be embodied in means for supporting any rotatable member which is subjected to longitudinal thrusts. The drill mechanism comprises a cylinder 2 having a head block 3 and a chuck housing 4 clamped to its opposite ends by side rods 5. Reciprocable within the cylinder is a hammer piston, not shown, for delivering impact blows to the end of a drilling tool 6 supported by the chuck 4. The hammer piston is reciprocated by pressure fluid supplied from a conduit 8 to the cylinder 2 under the control of a manually operated valve 10. The cylinder 2 is slidably mounted on a supporting and guiding frame 12 which has a trunnion support 13 adapted to be clamped in a suitable mounting. Extending longitudinally of the supporting and guiding frame is a feed screw 14 rotatably supported at its forward end by a transverse member 15 attached to the frame 12, as by bolts 16. At the rear end of the supporting and guiding frame is my improved bearing structure 18 associated with the rear end of the feed screw. Attached to the rear end of the feed screw is a handle 19 by means of which the feed screw may be manually rotated. Fixed to the lower side of cylinder 2 is a feed nut 20 threadedly engaging the feed screw.

In the preferred form of my invention, shown in Figs. 2, 3 and 4, a bearing sleeve 22 fits within a bore 23 extending through a transverse portion 24 shown here as being formed integral with the supporting and guiding frame 12. An annular groove 25 is formed in the outer periphery of the bearing sleeve between its ends, and the transverse portion 24 is cut away at its upper side, as at 26, so that the central portion of a U-bolt 27 may be received in the groove. The legs of the U-bolt extend through openings 28 at the sides of the bore 23 and have nuts 29 threaded on their ends for drawing up the U-bolt to clamp the bearing sleeve firmly in place. The central portion of the U-bolt is shown herein as having a rectangular shaped cross section and is of such dimension that it extends from the bottom of the groove 25 up through the opening in the portion 24 where it engages the sides of the opening and is supported against longitudinal thrusts. Extending into the bearing sleeve 22 is another bearing sleeve or wear bushing 31 which is pressed onto the feed screw 14 so that it rotates with the latter but may be adjusted longitudinally of the screw when necessary. Formed on the sleeve or bushing 31 is a flange portion 32 which is adapted to abut one end of the sleeve 22. The opposite end of the sleeve 22 is cut away around its inner periphery to provide a bore 33 for receiving an enlarged portion 34 formed on the feed screw. The portion 34 abuts a shoulder 35 at the inner end of the bore 33 and prevents rearward longitudinal movements of the feed screw. The handle 19 is provided with a split hub 37 which is threaded upon the rear end of the feed screw, and a bolt 38 extends through the split portions of the hub for clamping the latter in its adjusted positions on the screw. The hub is threaded upon the feed screw to move the enlarged portion 34 and the sleeve or bushing 31 toward each other until the desired clearance is obtained at the opposite ends of the sleeve 22, and then the hub is clamped upon the screw. As wear takes place on the bearing surfaces, the hub may be loosened and turned again upon the screw to adjust clearances. Formed on the forward end of the sleeve 22 is a flange portion 39 which abuts the forward edge of the transverse portion 24 so that the latter may carry part of the load produced by the rearward thrusts of the feed screw. With this construction it is necessary, in replacing the bearing sleeve 22, to remove both the handle 19 and the transverse member 15 so that the feed screw may be moved forwardly out of the sleeve.

In the form of the invention shown in Fig. 5, a bearing sleeve 41 is supported in a cradle 42 formed in a transverse portion 43 at the rear end of the supporting and guiding frame. A U-bolt 44 fits within an annular groove 45 in the sleeve 41 and has its legs extending through openings in the portion 43. Nuts 47 are threaded on the ends of the legs for clamping the bearing sleeve firmly in place. The hub 37 of the handle 19 is threaded upon the rear end of the feed screw 14 and bears directly against the rear end of the bearing sleeve so as to draw the enlargement 34 on the feed screw toward the forward end of the bearing sleeve until the desired clearance is obtained. To replace the bearing sleeve, it is only necessary to remove the handle 19 and to release the U-bolt until the sleeve may be slid out of its cradle rearwardly along the feed screw.

In Fig. 6 there is shown another modification in which a transverse portion 50 at the rear end of the supporting and guiding frame is provided with stepped bores 51 and 52. A washer 53 fits within the bore 51 and abuts the shoulder 54 at the junction of the two bores. The opening through the washer and the bore 52 are of such diameters that the feed screw 14 may be inserted through them until the enlarged portion 34 abuts the washer. A bearing sleeve 55 fits within the bore 51 and is cut away, as at 56, to receive the enlarged portion 34. The sleeve 55 is provided with an annular groove 58, and the transverse portion 50 is cut away at its upper side so that a U-bolt 59 may be placed in the groove 58 for clamping the bearing sleeve in place. The handle hub 37 is clamped on the feed screw in a position to provide enough clearance between itself and the bearing sleeve 55 so that the forward thrusts of the feed screw are carried by the washer 53. When the bearing surfaces become worn and it is desired to take up the longitudinal play of the feed screw, another washer may be inserted at the forward side of the enlarged portion 34.

As a result of this invention there is provided an improved bearing structure which is easily adjustable to take up play caused by a wearing of its parts. It is so constructed that the parts subjected to wear are easily and inexpensively replaced.

While there are in this application specifically described several forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. In a bearing structure, the combination with a rotatable member to be journaled having an enlarged portion formed thereon and a bearing support having a socket, of a bearing sleeve detachably mounted in said support socket and in which said member is journaled, said bearing sleeve surrounding said rotatable member and having a bore in one end for receiving the enlarged portion of said member, adjustable means acting against said sleeve for drawing the enlarged portion into said bore and including an adjustable element threaded on said member at the other end of said bearing sleeve, said adjustable element and the enlarged portion of said rotatable member cooperating with said bearing sleeve for limiting axial movement of said member relative to said bearing sleeve, said bearing sleeve having a groove on its outer periphery, and means including a U-bolt fitting within said groove for clamping said bearing sleeve in a stationary position in said support socket.

2. In a bearing structure, the combination with an elongated rotatable member to be journaled having an enlarged portion and a support having a socket, of a bearing sleeve detachably mounted in said support socket for free axial release therefrom and surrounding said elongated member and in which said member is journaled, said sleeve also having an end surface engageable by the enlarged portion of said member, an element threaded on said member at the other end of said sleeve and engageable with the latter, said element and the enlarged portion of said member cooperating with said bearing sleeve for limiting axial movement of said member relative to said bearing sleeve, and means including a releasable clamping element laterally engaging said bearing sleeve for clamping the latter in a stationary position in said support socket, said clamping means being releasable and said support being so constructed as to permit free axial bodily removal of said bearing sleeve with said rotatable member from said support while the relation of said sleeve relative to said enlarged portion and said threaded element remains undisturbed.

3. In a bearing structure, the combination with a rotatable member to be journaled having an enlarged portion thereon and a bearing support, of a replaceable bearing sleeve surrounding said member and in which said member is journaled, said bearing sleeve being detachably mounted in said support for free axial release therefrom and having an end surface engageable by the enlarged portion of said rotatable member, means rotating with said member and adjustable longitudinally relative to the latter into engagement with the opposite end surface of said bearing sleeve, means for holding said adjustable means in its adjusted positions on said rotatable member, and means including a releasable clamping element laterally engaging said bearing sleeve between its ends for clamping said sleeve in a stationary position in said bearing support, said clamping element being releasable and said support being so constructed as to permit free axial release of said bearing sleeve with said rotatable member from said bearing support while the relation of said sleeve with said enlarged portion and said adjustable means remains undisturbed.

4. In a bearing structure, the combination with a rotatable member to be journaled having an enlarged portion thereon and a bearing support, of a replaceable bearing sleeve surrounding said rotatable member and in which said member is journaled, said bearing sleeve being detachably mounted in said support and having an end surface engageable by the enlarged portion of said rotatable member, a wear bushing mounted on said rotatable member for rotation therewith and for movement longitudinally relative to the latter into engagement with the opposite end surface of said bearing sleeve, adjustable means for moving said wear bushing longitudinally on said rotatable member, and means for clamping said bearing sleeve in a stationary position on said support.

5. In a bearing structure, the comination with a rotatable member to be journaled and having thereon means providing longitudinally spaced opposed transverse surfaces, of a stationary supporting structure having a bore extending therethrough, a replaceable cylindrical bearing sleeve detachably mounted on said supporting structure and fitting within said bore and in which said rotatable member is journaled, said bearing sleeve having oppositely facing end surfaces upon which said transverse surfaces respectively react to cause said sleeve to receive the axial thrust of said rotatable member in opposite directions, and said sleeve also having an annular groove on its outer periphery, and said bore having an opening in the wall thereof opposite said groove, and a clamping member fitting within said groove and extending through said opening for securing said bearing sleeve in a stationary position within said bore.

6. In a bearing structure, the combination with a rotatable member to be journaled, of a stationary supporting structure having a bore extending therethrough, a replaceable cylindrical bearing sleeve detachably mounted on said supporting structure and fitting within said bore, said sleeve surrounding said rotatable member and the latter being journaled therein, said bearing sleeve having an annular groove on its outer periphery and said bore having an opening in the wall thereof opposite said groove, a clamping member fitting within said groove and extending through said opening for securing said bearing sleeve in a stationary position within said bore, and means carried by said rotatable member and including abutment providing means arranged at the opposite ends of said bearing sleeve for cooperation with the latter for holding said rotatable member against longitudinal movement relative to said supporting structure, said last mentioned means being relatively adjustable for taking up any play resulting from wear at the ends of said bearing sleeve.

7. In a bearing structure, the combination with a rotatable member to be journaled, of a stationary supporting structure having coaxial stepped bores extending therethrough, asid rotatable member extending through said bores and having an enlarged portion within the larger one of said bores, a bearing member arranged between the shoulder at the junction of said bores and one end of said enlarged portion, a replaceable bearing sleeve detachably mounted and fitting within the larger one of said bores and in which said rotatable member is journaled, said bearing sleeve having an end surface engageable by the opposite end of said enlarged portion and a groove on its outer periphery between its ends, and means for clamping said bearing sleeve in a stationary position on said supporting structure, said clamping means including a releasable clamping element engaging said supporting structure and fitting within said sleeve-groove.

8. In a bearing structure, the combination with a rotatable member to be journaled, of a stationary supporting structure having coaxial stepped bores extending therethrough, said rotatable member extending through said bores and having an enlarged portion within the larger one of said bores, a bearing member arranged between the shoulder at the junction of said bores and one end of said enlarged portion, a bearing sleeve fitting within the larger one of said bores and having an end surface engageable by the opposite end of said enlarged portion, a groove in the outer periphery of said bearing sleeve, an opening in the wall of the larger one of said bores opposite said groove, and means including a clamping member fitting within said groove and extending through said opening for holding said bearing sleeve in a fixed position relative to said supporting structure.

9. In a bearing structure, a support having a socket, a replaceable bearing element detachably mounted in the socket of said support and having a peripheral groove, a U-bolt coacting with the walls of said groove for holding said bearing element in a stationary position in said support socket, a member having a portion journaled in said bearing element and having a collar cooperating with the latter to limit relative axial movement in one direction, and an element adjustably secured to said member and coacting with said bearing element to limit relative axial movement between said member and element in the opposite direction.

10. In a bearing structure, the combination with a rotatable member to be journaled having an enlarged portion, of a bearing sleeve surrounding said rotatable member and having an end surface engageable by said enlarged portion, a wear bushing rotatable within said bearing sleeve and fixed for rotation with said rotatable member, said wear bushing being adjustable longitudinally of said rotatable member and having an enlarged portion engageable with the opposite end of said bearing sleeve, means for adjusting the position of said wear bushing on said rotatable member, and means for clamping said bearing sleeve in a fixed position.

11. In a bearing structure, a support having a socket, a replaceable bearing element detachably mounted in said socket for free axial release therefrom, releasable means including a releasable securing element coacting laterally with said bearing element between its ends for holding the latter against axial displacement in said socket, a member having a portion rotatably supported by said bearing element and having a transverse surface thereon cooperating with said bearing element to limit relative axial movement in one direction, and adjustable means coacting with said bearing element for limiting relative axial movement between said member and said element in the opposite direction, said adjustable means including an element adjustably secured to said rotatable member.

12. In a bearing structure, a support having a socket, a replaceable bearing element detachably mounted in said socket and having a peripheral groove, a U-bolt coacting with the walls of said groove for holding said bearing element against axial displacement in said socket, a rotatable member rotatably supported by said bearing element, means on said member cooperating with said bearing element to limit relative axial movement in one direction, and adjustable means coacting with said bearing element to limit relative axial movement between said member and said element in the opposite direction, said adjustable means including an adjustable element secured to said rotatable member.

ELMER G. GARTIN.

REFERENCES CITED

The following references are of record in the file of this patent:

UNITED STATES PATENTS

| Number | Name | Date |
|---|---|---|
| 537,649 | Schwarz | Aug. 3, 1895 |
| 608,398 | Baker | Aug. 2, 1898 |
| 1,057,270 | Primm | Mar. 23, 1913 |
| 1,130,982 | Kinkead | Mar. 9, 1915 |
| 1,148,741 | Beede | Aug. 3, 1915 |
| 1,266,724 | Shields | May 21, 1918 |
| 1,313,256 | Cannon | Aug. 19, 1919 |
| 1,375,236 | Skinder | Apr. 19, 1921 |
| 1,586,959 | Blake | June 1, 1926 |
| 1,690,425 | Norton | Nov. 6, 1928 |
| 1,800,293 | Hehemann | Apr. 14, 1931 |
| 1,859,748 | Nell | May 24, 1932 |
| 1,971,547 | White | Aug. 28, 1934 |

FOREIGN PATENTS

| Number | Country | Date |
|---|---|---|
| 21,340 | Great Britain | Oct. 21, 1914 |